(12) United States Patent
Seo et al.

(10) Patent No.: US 12,280,442 B2
(45) Date of Patent: Apr. 22, 2025

(54) ROTARY TOOL, JOINING DEVICE, AND JOINING METHOD

(71) Applicant: NIPPON LIGHT METAL COMPANY, LTD., Tokyo (JP)

(72) Inventors: Nobushiro Seo, Shizuoka (JP); Ryo Yoshida, Shizuoka (JP); Shingo Koizumi, Shizuoka (JP); Keita Oikawa, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 18/255,818

(22) PCT Filed: Nov. 1, 2021

(86) PCT No.: PCT/JP2021/040291
§ 371 (c)(1),
(2) Date: Jun. 2, 2023

(87) PCT Pub. No.: WO2022/118591
PCT Pub. Date: Jun. 9, 2022

(65) Prior Publication Data
US 2024/0009757 A1    Jan. 11, 2024

(30) Foreign Application Priority Data

Dec. 4, 2020   (JP) ................................ 2020-201871

(51) Int. Cl.
*B23K 20/12*   (2006.01)
(52) U.S. Cl.
CPC ........ *B23K 20/1255* (2013.01); *B23K 20/123* (2013.01)

(58) Field of Classification Search
CPC .................. B23K 20/122–128; B23K 20/1255
(Continued)

(56) References Cited

U.S. PATENT DOCUMENTS 6,739,495 B2 *   5/2004   Okamura ............... B23K 33/00
                                                            228/2.1
2014/0069985 A1    3/2014   Okada et al.
(Continued)

FOREIGN PATENT DOCUMENTS

CA          2796617 A1 *   5/2013   ............ B23K 20/10
CN       104985320 A   *  10/2015
(Continued)

OTHER PUBLICATIONS

International Search Report and Written Opinion for PCT/JP2021/040291 (Jan. 18, 2022).
(Continued)

*Primary Examiner* — Kiley S Stoner
(74) *Attorney, Agent, or Firm* — Merchant & Gould P.C.

(57) ABSTRACT

A rotary tool used in a joining device that performs friction stir welding of a joint member. The rotary tool includes: a main body having a fixed unit attached and secured to the joining device, and a rotary shaft for transmitting a rotary force from the joining device; a stirring member that has a stirring pin inserted into the joint member to perform friction stirring on the joint member, that is arranged so as to be rotatable by receiving the rotary force from the rotary shaft, and that is provided on the main body so as to be movable relative to an axial direction of the rotary shaft; and an elastic member that biases the stirring member toward a distal-end side relative to the axial direction of the rotary shaft.

12 Claims, 9 Drawing Sheets

(58) Field of Classification Search
USPC .............................................. 228/112.1, 2.1
See application file for complete search history.

(56) References Cited

U.S. PATENT DOCUMENTS

| | | | | |
|---|---|---|---|---|
| 2015/0273637 | A1* | 10/2015 | Hori | ..................... B23K 20/122 29/890.03 |
| 2018/0099349 | A1* | 4/2018 | Packer | ............... B23K 20/1255 |
| 2021/0162531 | A1* | 6/2021 | Hori | ................... B23K 20/1225 |

FOREIGN PATENT DOCUMENTS

| | | | | | |
|---|---|---|---|---|---|
| CN | 105108329 | A | * | 12/2015 | ......... B23K 20/1255 |
| CN | 105171230 | A | * | 12/2015 | ............ B23K 20/122 |
| CN | 105598575 | A | * | 5/2016 | ......... B23K 20/1255 |
| CN | 105921877 | A | * | 9/2016 | ............ B23K 20/123 |
| CN | 105921878 | A | * | 9/2016 | ............ B23K 20/123 |
| CN | 106624340 | A | * | 5/2017 | ............ B23K 20/122 |
| CN | 108555433 | A | * | 9/2018 | ......... B23K 20/1265 |
| CN | 108971743 | A | * | 12/2018 | |
| CN | 108971744 | A | * | 12/2018 | ............ B23K 20/122 |
| CN | 109048044 | A | * | 12/2018 | ......... B23K 20/1255 |
| CN | 109551098 | A | * | 4/2019 | ............ B23K 20/122 |
| CN | 109570736 | A | * | 4/2019 | ......... B23K 20/1245 |
| CN | 107175401 | B | | 9/2019 | |
| CN | 110802317 | A | * | 2/2020 | ......... B23K 20/1245 |
| CN | 110860780 | A | * | 3/2020 | ......... B23K 20/1245 |
| CN | 110860783 | A | * | 3/2020 | ......... B23K 20/1245 |
| CN | 112108757 | A | * | 12/2020 | ......... B23K 20/1245 |
| CN | 112548315 | A | * | 3/2021 | ............. B23K 20/12 |
| CN | 113118616 | A | * | 7/2021 | ........... B23K 20/122 |
| CN | 113134676 | A | * | 7/2021 | ......... B23K 20/1245 |
| DE | 202008001344 | U1 | * | 5/2008 | ........... B23K 20/125 |
| FR | 2922796 | A1 | * | 6/2009 | ......... B23K 20/1255 |
| JP | 2003-260572 | A | | 9/2003 | |
| JP | 2006297434 | A | * | 11/2006 | ........... B23K 20/125 |
| JP | 2012-196681 | A | | 10/2012 | |
| KR | 101331735 | B1 | * | 11/2013 | |
| WO | WO-2014046255 | A1 | * | 3/2014 | ........... B23K 20/125 |
| WO | WO-2022118589 | A1 | * | 6/2022 | ......... B23K 20/1255 |
| WO | WO-2022118590 | A1 | * | 6/2022 | ............. B23K 20/12 |

OTHER PUBLICATIONS

Non-final rejection for Taiwanese Patent Application No. 110144376 (Jul. 4, 2022).
Final rejection for Taiwanese Patent Application No. 110144376 (Jan. 12, 2023).

* cited by examiner

ROTARY TOOL, JOINING DEVICE, AND JOINING METHOD

This application is a National Stage Application of PCT/JP2021/040291, filed Nov. 1, 2021, which claims benefit of priority to Japanese Application No. 2020-201871, filed Dec. 4, 2020, and which applications are incorporated herein by reference. To the extent appropriate, a claim of priority is made to each of the above disclosed applications.

TECHNICAL FIELD

The present invention relates to a rotary tool, a joining device, and a joining method used for friction stir welding.

BACKGROUND ART

As a joining device for performing friction stir welding, one that carries out load control and one that carries out position control have been known, in order to control the pushing amount of a rotary tool relative to a joint member. The load control is mainly used in a joining device using a robot (robot arm), while the position control is mainly used in a joining device using a machining center (MC).

For example, Patent Literature 1 discloses a joining device that carries out load control. The joining device of Patent Literature 1 controls the depth of press-fitting of a shoulder member or a pin member into a joint object, in order to obtain good joining quality with a suitable precision according to joining conditions. In order to control the press-fitting depth, the joining device controls the position of the pin member relative to the shoulder member based on a press-fitting reference point set by a press-fitting reference point setting unit. The joining device includes a pressure detection unit, a pressure reference point setting unit, a tool drive control unit, and the like to carry out the above control.

CITATION LIST

Patent Literature

Patent Literature 1: JP2012-196681A

SUMMARY OF INVENTION

Technical Problem

The joining device of Patent Literature 1 carries out the load control and thus is complex in structure and expensive. Therefore, the recent demand has been for a rotary tool that can be mounted to a relatively inexpensive MC intended only for position control and that can carry out load control.

In view of the above, it is an object of the present invention to provide a rotary tool, a joining device, and a joining method that can carry out load control while mounted to a machining center.

Solution to Problem

An aspect of the present invention is a rotary tool used in a joining device that performs friction stir welding of a joint member, the rotary tool including: a main body having a fixed unit attached and secured to the joining device, and a rotary shaft for transmitting a rotary force from the joining device; a stirring member that has a stirring pin inserted into the joint member to perform friction stirring on the joint member, that is arranged so as to be rotatable by receiving the rotary force from the rotary shaft, and that is provided on the main body so as to be movable relative to an axial direction of the rotary shaft; and an elastic member that biases the stirring member toward a distal-end side relative to the axial direction of the rotary shaft.

Preferably, in the rotary tool of the present invention, the main body further includes a cylindrical holder attached to the rotary shaft and a slide shaft that is housed in a center portion of the holder so as to be slidable in the axial direction of the rotary shaft and that rotates synchronously with the holder, the stirring member is provided at a distal end of the slide shaft, and the slide shaft is biased toward the distal-end side of the stirring member via the elastic member.

Preferably, in the rotary tool of the present invention, the elastic member is housed inside the holder and arranged between a base end portion of the slide shaft and a bottom portion of the holder on a proximal-end side.

Preferably, in the rotary tool of the present invention, the elastic member is arranged so as to surround a lower part of the slide shaft.

Preferably, in the rotary tool of the present invention, a key groove elongated in the axial direction of the rotary shaft is formed on one of the holder and the slide shaft, and a key is formed on the other one of the holder and the slide shaft so as to extend in a direction intersecting with the axial direction of the rotary shaft and fit into the key groove, the key moves inside the key groove along the axial direction of the rotary shaft as the slide shaft moves in the axial direction of the rotary shaft, and the key and the key groove come into contact with each other in a circumferential direction as the holder rotates, and thus the holder and the slide shaft rotate synchronously.

Preferably, in the rotary tool of the present invention, the elastic member imparts elastic force by at least one selected from a solid spring, a fluid spring, magnetic force, and electromagnetic force.

Preferably, in the rotary tool of the present invention, the stirring member further includes a shoulder, the shoulder being connected to the slide shaft, having a cylindrical or truncated cone shape, and having a lower end surface with a flat or mortar-shaped configuration, and the lower end surface thereof comes into contact with the joint member, and the stirring pin hangs down from the lower end surface of the shoulder.

Preferably, in the rotary tool of the present invention, the stirring member further includes a connector that is connected to the slide shaft and has a cylindrical or truncated cone shape, and the stirring pin hangs down from a lower end surface of the connector.

A second aspect of the present invention is a joining device including the rotary tool according to any one of claims 1 to 8. The joining device includes a power unit that outputs the rotary force to be transmitted to the rotary shaft of the rotary tool, and a position controller that performs position control of the rotary tool by holding the fixed unit of the rotary tool. Friction stir welding is performed on the joint member by moving the rotary tool to be in a predetermined height position with respect to the joint member by the position controller and inserting the stirring pin into the joint member.

Preferably, in the joining device of the present invention, the rotary tool is the rotary tool according to claim 7, and friction stir welding is performed on the joint member by inserting the stirring pin and the shoulder that rotates together with the stirring pin into the joint member.

Preferably, in the joining device of the present invention, the rotary tool is the rotary tool according to claim 8, and friction stir welding is performed on the joint member by inserting only the rotating stirring pin into the joint member in a state where the connector is separated from the joint member.

A third aspect of the present invention is a joining method including: performing friction stir welding on the joint member by moving the rotary tool according to any one of claims 1 to 8 to be in a predetermined height position with respect to the joint member and inserting the stirring pin into the joint member.

Preferably, in the joining method of the present invention, the rotary tool is the rotary tool according to claim 7, and friction stir welding is performed on the joint member by inserting the stirring pin and the shoulder that rotates together with the stirring pin into the joint member.

Preferably, in the joining method of the present invention, the rotary tool is the rotary tool according to claim 8, and friction stir welding is performed on the joint member by inserting only the rotating stirring pin into the joint member in a state where the connector is separated from the joint member.

Advantageous Effects of Invention

The rotary tool, the joining device, and the joining method according to the present invention can carry out load control using an elastic member.

DESCRIPTION OF EMBODIMENTS

Hereinafter, embodiments of the present invention will be described with reference to the accompanying drawings. The present invention is not limited only to the following embodiments. Also, some or all of the constituent elements in the embodiments can be combined as appropriate. Further, because the drawings are for conceptually explaining the present invention, dimensions of the respective constituent elements expressed and ratios thereof may be different from actual ones.

1. Rotary Tool

Figure 1:
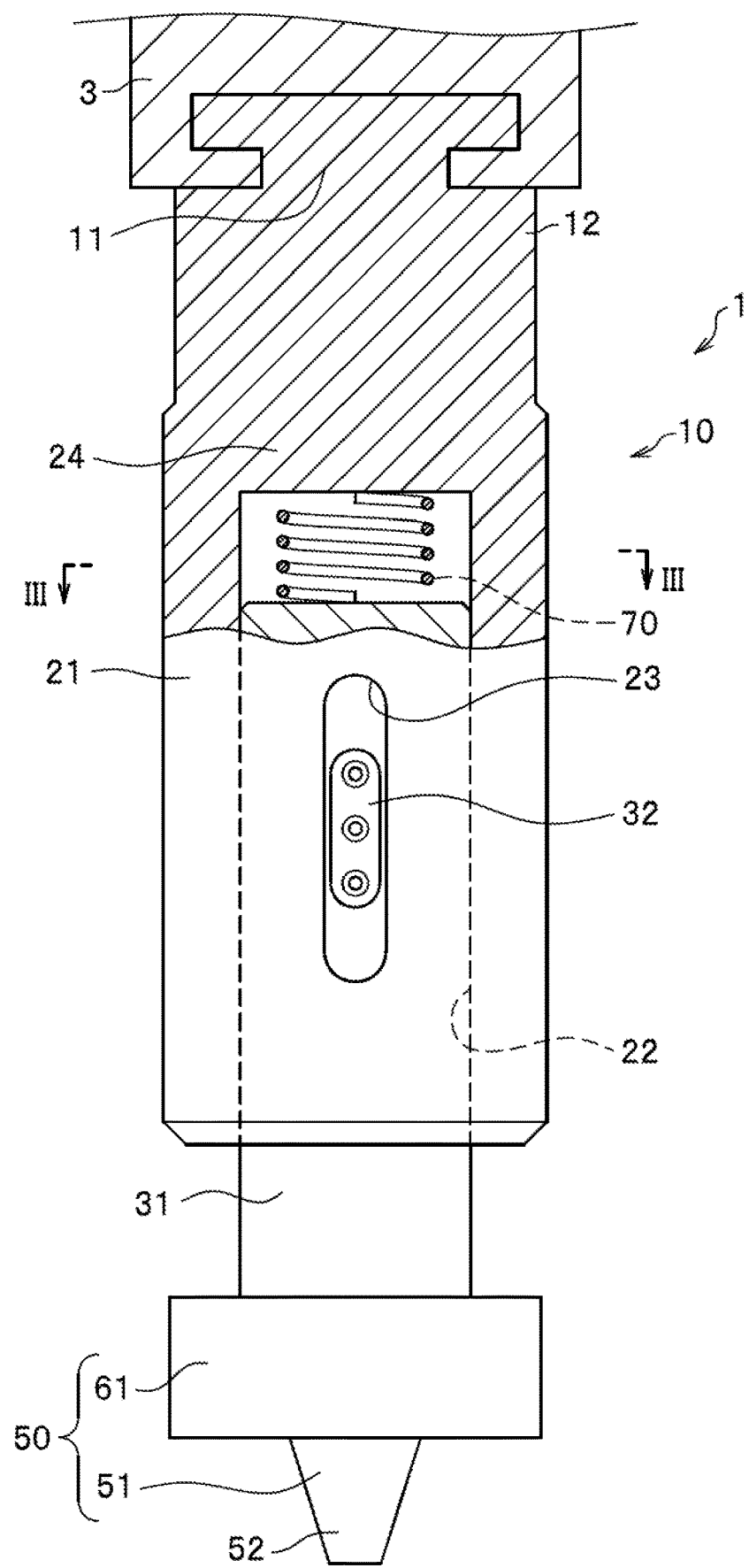
FIG. 1 is a partial cross-sectional side view showing a rotary tool according to an embodiment of the present invention.
Figure 2:
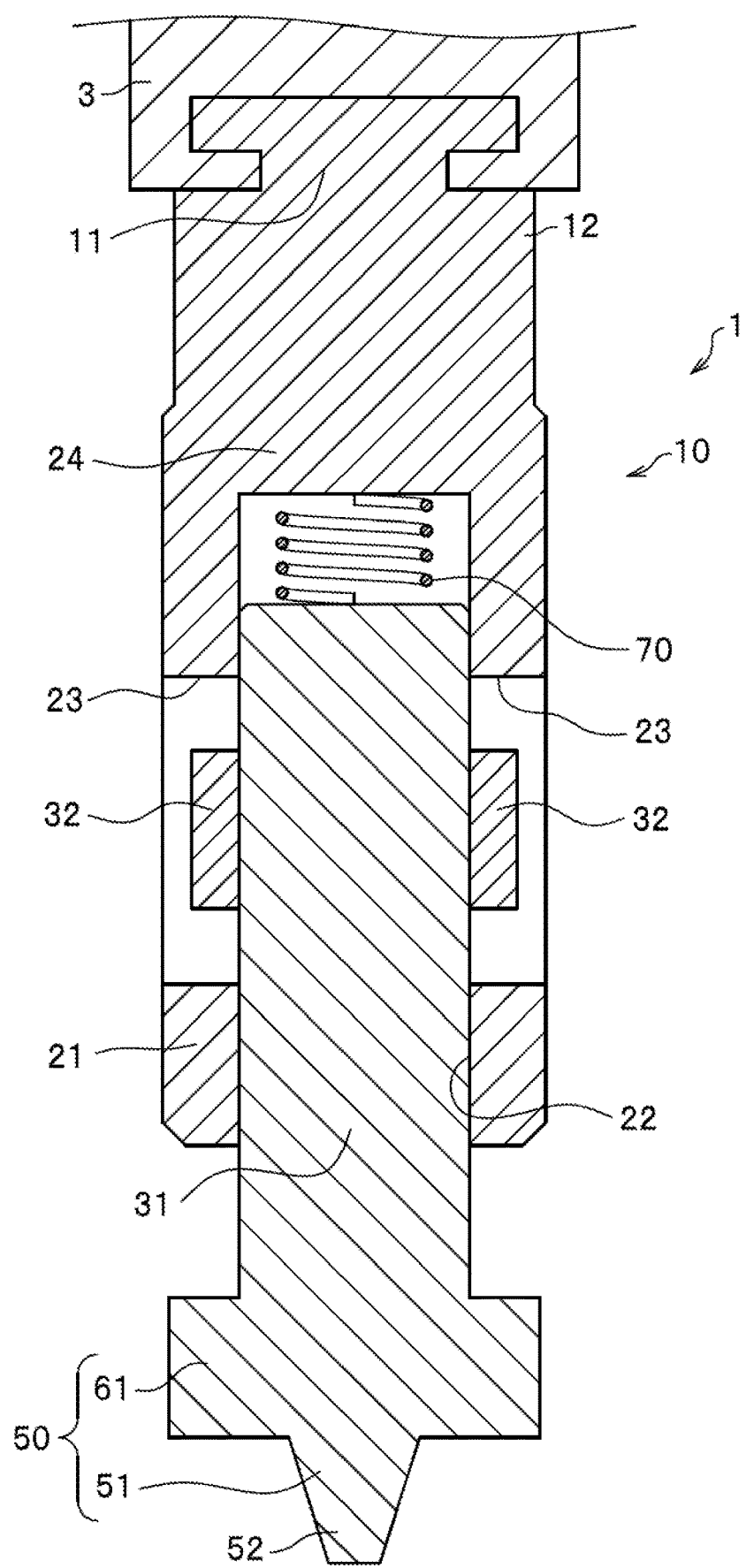
FIG. 2 is a vertical sectional view showing the rotary tool according to the embodiment.

First, a configuration of a rotary tool according to a first embodiment (hereinafter referred to as this embodiment) will be described. As shown in FIGS. 1 and 2, a rotary tool 1 according to this embodiment is used in a joining device that performs friction stir welding of a joint member 2 (see FIG. 6), and is inserted into a butted part of the joint member 2 while rotating. The rotary tool 1 includes a main body 10, a stirring member 50, and an elastic member 70.

<Main Body>

The main body 10 is a part fixed to a joining device 3 such as a machining center, for example, and includes a fixed unit 11 and a rotary shaft 12. The fixed unit 11 is a part that is attached and secured to the joining device 3 and has a cylindrical shape. The fixed unit 11 is a chuck mechanism and can be detachably fixed to the joining device by cooperating with a chuck mechanism to be paired therewith, which is provided in the joining device 3. Examples of the chuck mechanism include grooves provided in the fixed unit 11 and claws provided in the joining device 3 that fit into the grooves on the fixed unit 11 to clamp the fixed unit 11. The rotary shaft 12 is connected to the other end side (lower side in FIG. 1) of the fixed unit 11 that is attached to the joining device 3. The rotary shaft 12 has a cylindrical shape. The rotary shaft 12 is a part that transmits a rotary force from the joining device 3 to the stirring member 50, and is connected to a rotary shaft (not shown) of the joining device 3 via the fixed unit 11.

Figure 3:
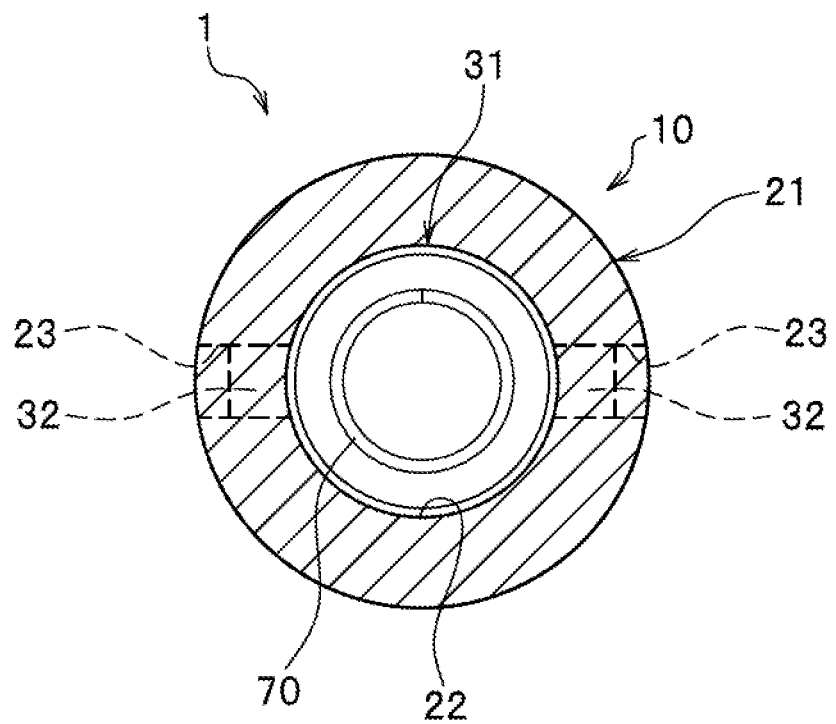
FIG. 3 is a horizontal sectional view showing the rotary tool according to the embodiment.
Figure 4:
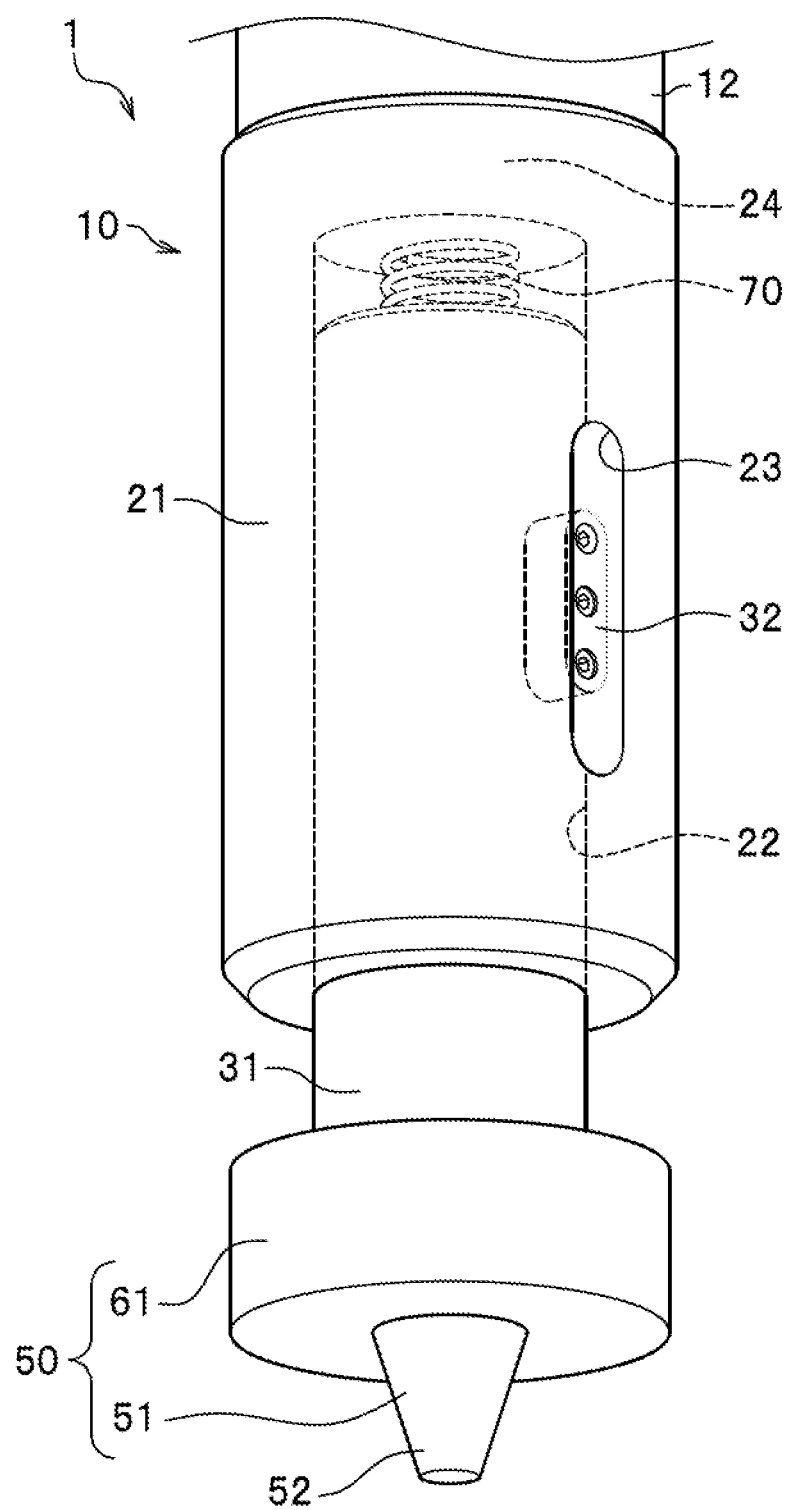
FIG. 4 is a perspective view showing the rotary tool according to the embodiment.
Figure 5:
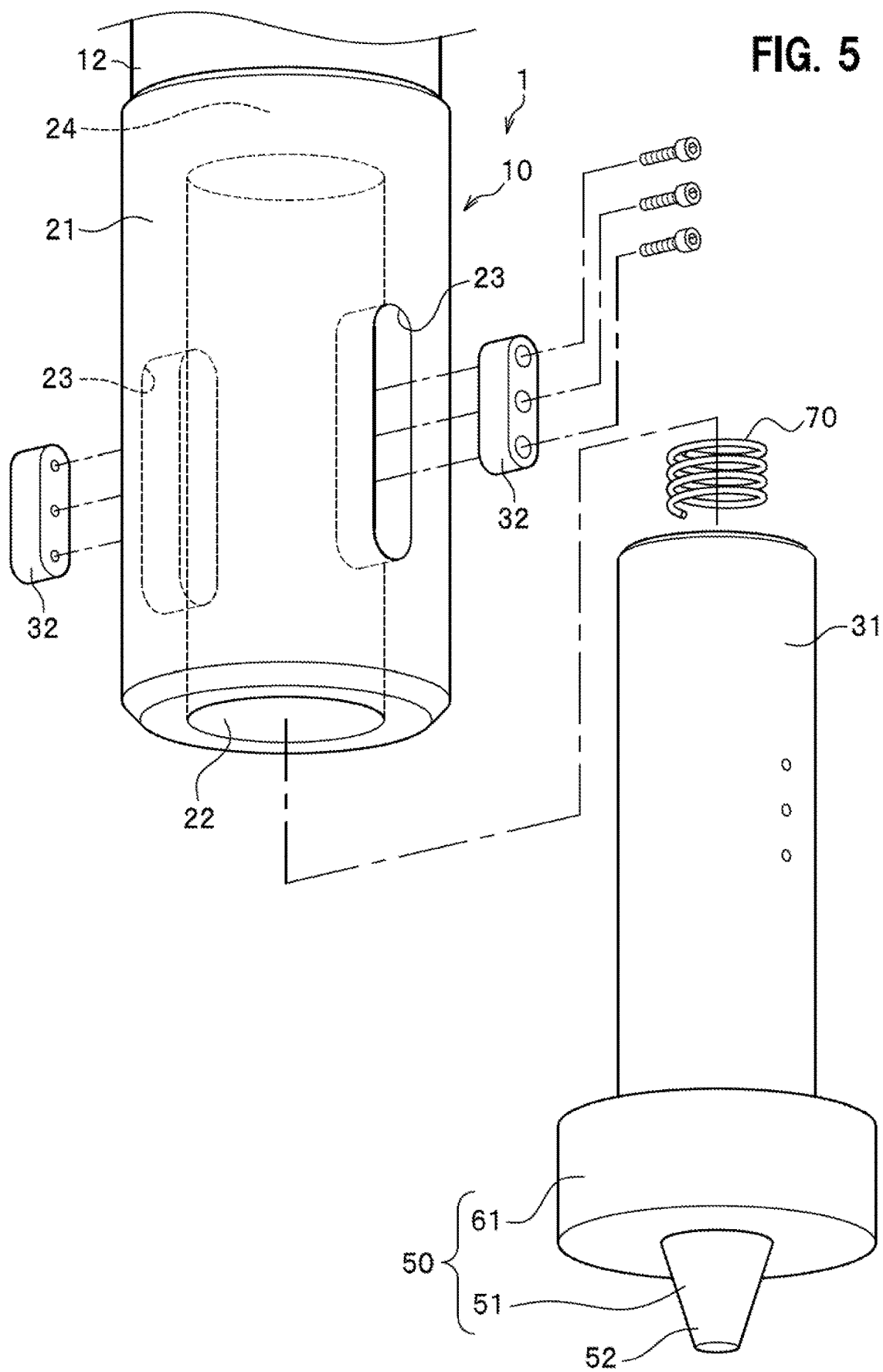
FIG. 5 is an exploded perspective view showing the rotary tool according to the embodiment.

As shown in FIGS. 3 to 5, the main body 10 further includes a holder 21 and a slide shaft 31.

<Holder>

The holder 21 is a part that is attached to the rotary shaft 12, rotates synchronously with the rotary shaft 12, and supports the slide shaft 31 and the stirring member 50. The holder 21 has a bottomed cylindrical shape having a bottom portion 24 at its base end portion (end portion on a side of the joining device 3: upper end portion in FIG. 1), and a hollow portion formed therein serves as a housing recess 22, into which the slide shaft 31 is inserted. The housing recess 22 has a columnar shape and opens toward an axial distal end of the rotary shaft 12 (lower side in FIG. 1). A key groove 23 is formed in a cylinder barrel portion of the holder 21. The key groove 23 is formed in an oval shape that is elongated along an axial direction of the rotary shaft 12 (vertical direction in FIG. 1), and penetrates from the outer peripheral surface to the inner peripheral surface of the holder 21. The key groove 23 may not penetrate the cylinder barrel portion, and may be formed in the shape of a groove on the inner peripheral surface of the cylinder barrel portion. The key grooves 23 are arranged at 180° intervals in the circumferential direction of the cylinder barrel portion and are formed at two locations facing each other. The number of the key grooves 23 is not limited to two, and may be one or greater than or equal to three.

<Slide Shaft>

The slide shaft 31 is a part that is housed in the housing recess 22 of the holder 21 so as to be slidable in the axial direction of the rotary shaft (vertical direction in FIG. 1) and that rotates synchronously (co-rotates) with the holder 21. The slide shaft 31 has a cylindrical shape and has an outside diameter that allows to be housed in the housing recess 22. A key 32 projecting outward is provided on the outer peripheral surface of the slide shaft 31. The key 32 is fixed at a position corresponding to the key groove 23 and is inserted into the key groove 23. The key 32 has an oval shape that is long in the axial direction of the rotary shaft, has the same width as the key groove 23, and has a length shorter than that of the key groove 23 in the longitudinal direction. That is, the key 32 fits in the key groove 23 in the width direction and is movable in the longitudinal direction.

Note that the shape of the key 32 is not limited to the oval shape but may be any other shape such as a circle, an ellipse, an oblong ellipse, and a rectangle as long as the shape has the same width as the key groove 23. The stirring member 50 is integrally provided at the distal end portion of the slide shaft 31 (end portion on the side away from the joining device 3: lower end portion in FIG. 1). Therefore, the stirring member 50 is biased toward the distal-end side by the elastic member 70 and is thus biased toward the distal-end side of the slide shaft 31 (in a direction away from the joining device 3: lower end portion in FIG. 1).

<Stirring Member>

The stirring member 50 is a part that is provided so as to be rotatable by receiving a rotary force from the main body 10 and is provided on the main body 10 so as to be movable relative to the axial direction of the rotary shaft 12. The stirring member 50 includes a stirring pin 51 and a shoulder 61. The stirring member 50 is made of tool steel, for example. In this embodiment, the stirring pin 51 and the shoulder 61 are integrally configured to form a conventional stirring member 50. The stirring member 50 is formed integrally with the slide shaft 31. Therefore, the stirring member 50 rotates synchronously with the slide shaft 31 and moves in the axial direction of the rotary shaft 12 as the slide shaft 31 slides.

The stirring pin 51 is a part that is inserted into the joint member while rotating to perform friction stirring on the joint member. A distal end portion 52 (lower end portion in FIG. 1) of the stirring pin 51 tapers toward its tip. The tip of the distal end portion 52 of the stirring pin has a flat surface perpendicular to the axial direction. The shoulder 61 is integrally formed at the base end portion of the stirring pin 51.

The shoulder 61 is a part that presses the joint member with its lower end surface in contact with the joint member. The shoulder 61 is formed in a cylindrical shape that is enlarged in diameter from the base end portion of the stirring pin 51, and has a flat ring-shaped distal end surface (lower end surface). That is, a distal end portion 52 of the stirring pin 51 protrudes from the distal end surface of the shoulder 61 toward the distal-end side. In other words, the stirring pin 51 hangs down from the lower end surface of the shoulder 61. The shape of the shoulder 61 is not limited to the cylindrical shape, and may be a truncated cone shape. The lower end surface of the shoulder 61 may have a flat or mortar-shaped configuration. The lower end surface of the shoulder 61 may also have an uneven structure. The base end portion of the shoulder 61 is fixedly connected to the slide shaft 31. The shoulder 61 has a larger diameter than the slide shaft 31, and a ring-shaped step portion in planar view is formed at the connection between the shoulder 61 and the slide shaft 31 (base end portion of the shoulder 61 on a side of the slide shaft 31).

<Elastic Member>

The elastic member 70 is a part that biases the stirring member 50 equipped with the stirring pin 51 and the shoulder 61 toward the distal-end side with respect to the axial direction of the rotary shaft 12. The elastic member 70 is made of a coil spring, for example. The elastic member 70 is housed inside the holder 21 and mounted between the base end portion of the slide shaft 31 and the bottom portion 24 of the holder 21 on a proximal-end side. The elastic member 70 can bias the stirring member 50 toward the distal-end side against the force received from the stirring member 50.

The elasticity of the elastic member 70 is set such that the stirring pin 51 is displaced and inserted within a predetermined range within the entire movable range of the stirring pin 51 by the elastic member 70 (movable length of the key 32 in the key groove 23) when the stirring pin 51 is inserted with a predetermined pressing load into the joint member 2 made of at least one selected from aluminum, copper, magnesium, and an alloy thereof. For example, when the elastic member 70 is a coil spring and the load applied to the elastic member 70 is 100 kg to 5 t, the stirring pin 51 and the shoulder 60 are set to be inserted into the joint member 2 in a state where the elastic member 70 is deformed with the deflection amount within the range of 0 to 30% of the free length of the elastic member 70. Thus, even when the height of the joint member 2 changes as the stirring pin 51 is pushed into the joint member 2 at a given height, the insertion amount of the stirring pin 51 is easily kept constant by deforming the elastic member 70 according to the change in the joint member 2.

Note that the elastic member 70 is not limited to the coil spring, but may be a metal spring such as a plate spring or disc spring, or a polymer elastic member (elastomer) such as rubber, polymer resin, or sponge-like resin. The elastic member 70 may also be a fluid spring using air pressure, gas pressure, or hydraulic pressure, or a magnetic spring using magnetic force or electromagnetic force.

The elastic member 70 may be set so as to satisfy the relationship between deformation and elasticity when the stirring pin 51 is inserted to a predetermined depth, taking into account joining conditions. Further, the elastic member 70 may be set so as to satisfy the relationship between deformation and elasticity when the shoulder 61 is slightly inserted while in contact with the surface of the joint member 2, taking into account joining conditions. The joining conditions that affect the setting of the elastic member 70 include, for example, conditions of a joining member such as the material of the joint member 2 and the shape of the joint portion as well as joining conditions such as the insertion depth of the stirring pin 51, the contacting state of the shoulder 61, the shape of the rotary tool 1, a rotation speed, and a moving speed.

2. Joining Device

Next, a configuration of the joining device 3 including the rotary tool 1 having the configuration described above will be described. The joining device 3 includes: a power unit (not shown) that outputs a rotary force to be transmitted to the rotary shaft 12 of the rotary tool 1; and a position controller (not shown) that carries out position control of the rotary tool by holding the fixed unit 11 of the rotary tool 1. The joining device 3 includes a machining center that carries out position control, for example, and the position controller includes a CPU and the like to move the rotary tool 1 by operating the power unit based on position information inputted in advance. The power unit moves the rotary tool 1 in three axial directions of XYZ.

3. Joining Method

Next, a joining method according to the present invention will be described with reference to FIG. 6. In the joining method, friction stir welding is performed on the joint member 2 by moving the rotary tool 1 according to this embodiment to be in a preset predetermined height position with respect to the joint member 2, and inserting the stirring pin 51 and the shoulder 61 into the joint member 2 to a predetermined depth.

When inserting the stirring pin 51, the distal end of the stirring pin 51 first comes into contact with the joint member 2 as the rotary tool 1 approaches the joint member 2 in the insertion direction. When the rotary tool 1 further approaches the joint member 2, the elastic member 70 is compressed, thereby inserting the stirring pin 51 into the joint member 2 while increasing the elastic force of the elastic member 70 that biases the stirring member 50 toward the joint member 2. When the rotary tool 1 is further brought closer to the joint member 2, the shoulder 61 comes into contact with the joint member 2. As the elastic member 70 is compressed, the shoulder 61 is pressed against the joint member 2 while further increasing the elastic force of the elastic member 70 that biases the stirring member 50 toward the joint member 2. In this event, the elastic member 70 is set such that the elastic member 70 is not completely deformed and the shoulder 61 can be slightly inserted into the joint member 2 in a state where an excess force is left due to the deformation of the elastic member 70.

During joining with the rotary tool 1, the stirring pin 51 and the shoulder 61 are biased toward the distal-end side by the elastic member 70. When there is no error in the height of the joint member 2 with respect to the set value, as shown in the left part of FIG. 6, the distal end portion 52 of the stirring pin 51 is inserted into the joint member 2 to a desired depth. The shoulder 61 can be slightly inserted into the joint member 2 while in contact with the joint member 2.

Figure 6:
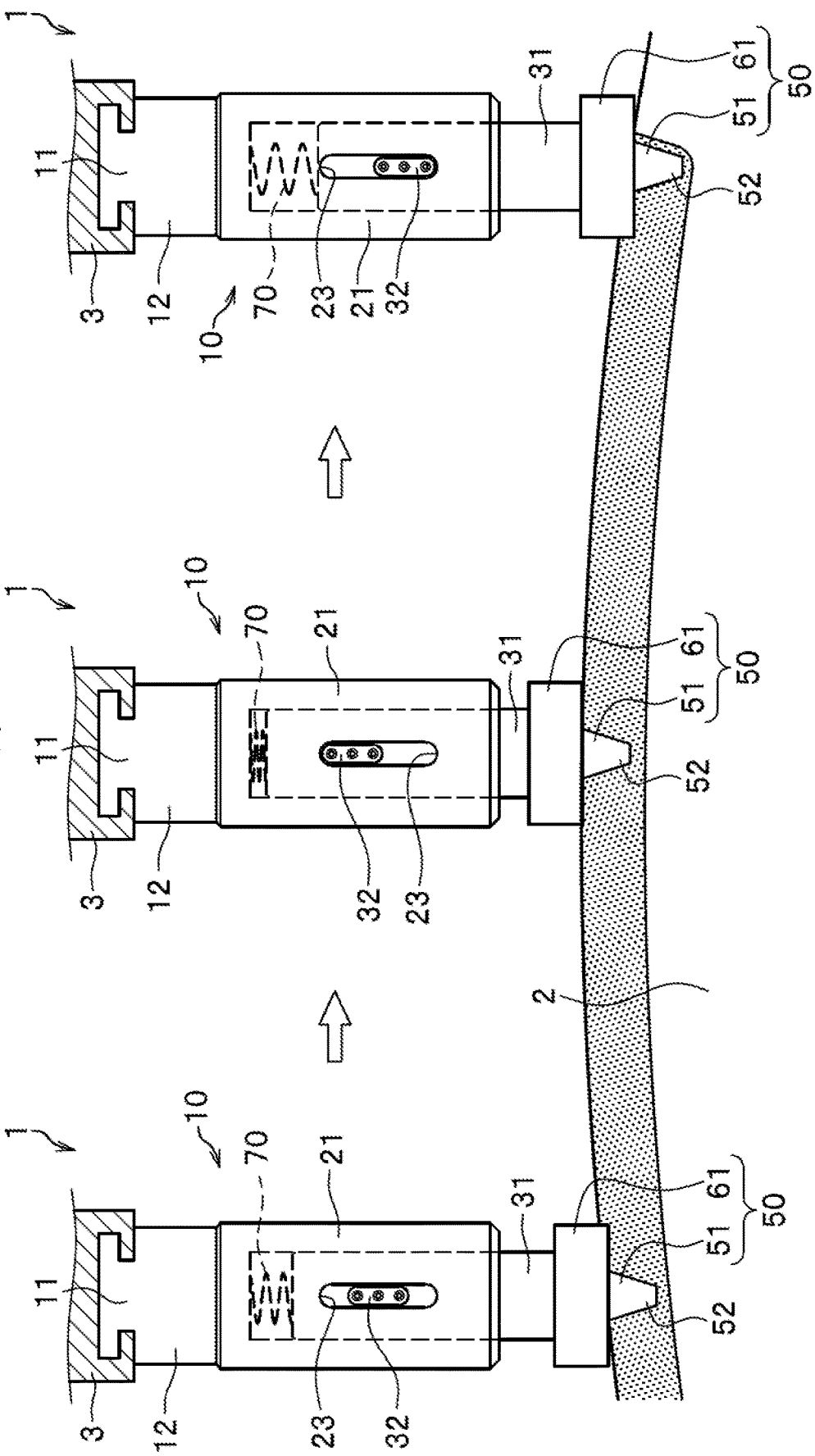
FIG. 6 is a cross-sectional view showing a state of the rotary tool according to the embodiment during friction stir welding.

Next, as shown in the center of FIG. 6, description is given of a case where the height of the joint member 2 is slightly higher than the set value due to an error during the friction stir welding. Here, if there is no elastic member 70 and the stirring pin 51 is pushed directly into the joint member 2, the insertion amount of the stirring pin 51 and the shoulder 61 increases with an increase in the height of the joint member 2, as compared with the case where there is no error in the height of the joint member 2 with respect to the set value. On the other hand, when joining is performed with the rotary tool 1 according to this embodiment, as the height of the joint member 2 is increased, the stirring member 50 is pushed up by an upward reaction force received from the joint member 2. At the same time, the elastic member 70 is compressed by this push-up, and the stirring member 50 is pushed down by a downward elastic force received from the elastic member 70. The position of the stirring member 50 is changed to a position where the upward reaction force and the downward elastic force caused by such a change in height of the joint member 2 are balanced. The elastic member 70 is set so that the insertion amount of the stirring pin 51 and the shoulder 61 in this event is approximately the same as the insertion amount thereof when there is no error in the height of the joint member 2 with respect to the set value. If the elastic force of the elastic member 70 is too weak, the upward reaction force due to the change in height of the joint member 2 increases, resulting in a reduction in the insertion amount. On the other hand, if the elastic force of the elastic member 70 is too strong, the downward elastic force due to the change in height of the joint member 2 increases, resulting in an increase in the insertion amount. More specifically, even when the height of the joint member 2 changes and increases, the elastic member 70 is set in the rotary tool 1 so that the stirring pin 51 is inserted into the joint member 2 to a desired depth set in accordance with the set value of the height of the joint member 2 and the shoulder 61 is slightly inserted into the joint member 2.

When the height of the joint member 2 becomes lower than the set value, as shown in the right part of FIG. 6, the elastic member 70 stretches and the stirring member 50 descends. Thus, even when the height of the joint member 2 changes and becomes lower, the elastic member 70 is set in the rotary tool 1 so that the stirring pin 51 is inserted into the joint member 2 to a desired depth set in accordance with the set value of the height of the joint member 2 and the shoulder 61 is slightly inserted into the joint member 2.

As described above, in the rotary tool 1, the stirring pin 51 and the shoulder 61 are inserted into the joint member 2 to a certain depth by the action of the elastic member 70. Thus, a plasticized region is formed at a certain depth. Therefore, stable joining quality can be achieved.

4. Advantageous Effects

According to the rotary tool 1, the joining device 3, and the joining method according to this embodiment, the stirring member 50 provided so as to be movable in the axial direction of the rotary shaft 12 is biased toward the distal-end side by the elastic member 70, and thus the stirring pin 51 is inserted to a predetermined depth according to the elasticity of the elastic member 70 when the distal end portion 52 of the stirring pin 51 is inserted into the joint member 2. By setting the elastic member 70 in consideration of the joining conditions such as the joining member and joining mode, the stirring pin 51 can be inserted to a desired depth. More specifically, the rotary tool 1 can perform simulative load control using the elastic member 70.

When a rotary tool having no elastic member is attached to a joining device such as a machining center, for example, that can only perform position control, a support height of the rotary tool 1 is kept constant based on a value set by the machining center, and the insertion position of the stirring member 50 is kept approximately constant. On the other hand, when the rotary tool 1 according to this embodiment is used, even when the support height of the rotary tool 1 by the machining center is constant, the elastic member 70 stretches according to the height of the joint member 2 and the stirring member 50 moves in the axial direction. Thus, by utilizing the elasticity of the elastic member 70, the load control can be performed by controlling the insertion depth of the stirring pin 51 into the joint member 2.

The main body 10 further includes the cylindrical holder 21 and the slide shaft 31 that is housed in the center portion of the holder 21 so as to be slidable in the axial direction of the rotary shaft and that rotates synchronously with the holder 21. The stirring member 50 is provided at the distal end of the slide shaft 31. Thus, the stirring member 50 can slide in the axial direction of the rotary shaft while transmitting the rotary force from the main body 10 to the stirring member 50.

The elastic member 70 is housed inside the holder 21 and arranged between the base end portion of the slide shaft 31 and the bottom portion 24 of the holder 21 on the proximal-end side. Thus, the elastic member 70 can be easily provided, and the precision of the load control of the stirring pin 51 can be improved.

The key groove 23 is formed in the holder 21 and the key 32 is formed on the slide shaft 31. Thus, the slide shaft 31 and the stirring member 50 rotate synchronously with the rotation of the rotary shaft and the holder 21, and allow axial movement in a stable state. Therefore, the operation of the stirring member 50 is further stabilized.

The elastic member 70 imparts elastic force by at least one selected from a solid spring, a fluid spring, magnetic force, and electromagnetic force. Such a configuration makes it easier to adjust the elasticity of the elastic member 70.

The stirring member 50 includes the shoulder 61, the shoulder 61 being connected to the slide shaft 31, having a cylindrical or truncated cone shape, and having a lower end surface with a flat or mortar-shaped configuration, and the lower end surface thereof comes into contact with the joint member 2. Further, the stirring pin 51 hangs down from the lower end surface of the shoulder 61. According to this configuration, by utilizing the elasticity of the elastic member 70, the insertion depth of the stirring pin 51 and the shoulder 61 into the joint member 2 can be controlled. In addition, the shoulder 61 presses the surface of the joint member 2, thereby improving the surface finish after the friction stir welding.

The joining device 3 includes the rotary tool 1, the power unit, and the position controller. The joining device 3 performs the friction stir welding with the position controller by moving the rotary tool 1 to be in a predetermined height position with respect to the joint member 2 and inserting the stirring pin 51 into the joint member 2. According to the joining device 3, by utilizing the elasticity of the elastic member 70, the friction stir welding can be performed while performing load control for controlling the insertion depth of the stirring pin 51 into the joint member 2.

The joining device 3 is a conventional type rotary tool 1 with the stirring pin 51 and the shoulder 61, and the friction stir welding is performed on the joint member 2 by inserting the stirring pin 51 and the shoulder 61 that rotates together with the stirring pin 51 into the joint member. Thus, the shoulder 61 presses the surface of the joint member 2, thereby improving the surface finish after the friction stir welding.

In the joining method described above, the friction stir welding is performed on the joint member 2 by moving the rotary tool 1 to be in a predetermined height position with respect to the joint member 2, and inserting the stirring pin 51 into the joint member 2. According to the joining method, by utilizing the elasticity of the elastic member 70, the friction stir welding can be performed while performing the load control for controlling the insertion depth of the stirring pin 51 into the joint member 2.

In this joining method, the rotary tool 3 is a conventional type rotary tool 1 with the stirring pin 51 and the shoulder 61, and the friction stir welding is performed on the joint member 2 by inserting the stirring pin 51 and the shoulder 61 that rotates together with the stirring pin 51 into the joint member 2. Thus, the shoulder 61 presses the surface of the joint member 2, thereby improving the surface finish after the friction stir welding.

6. First Modified Example

Figure 7:
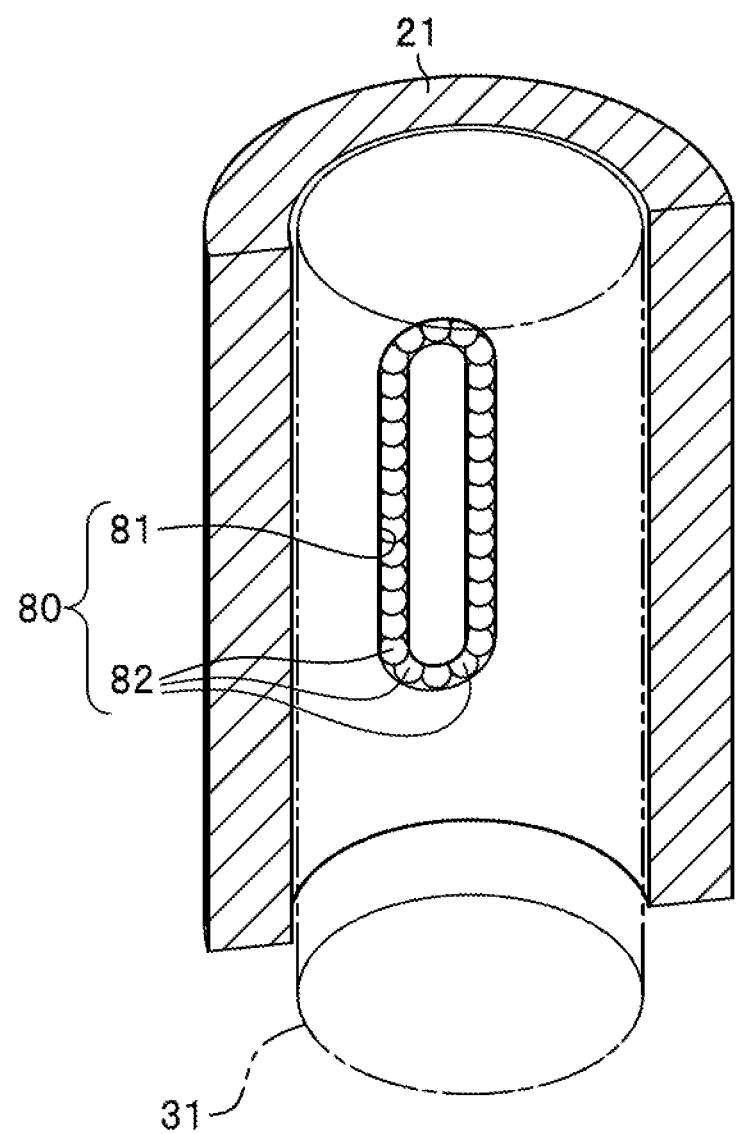
FIG. 7 is a partially broken perspective view showing a first modified example of the rotary tool according to the embodiment.
Figure 8:
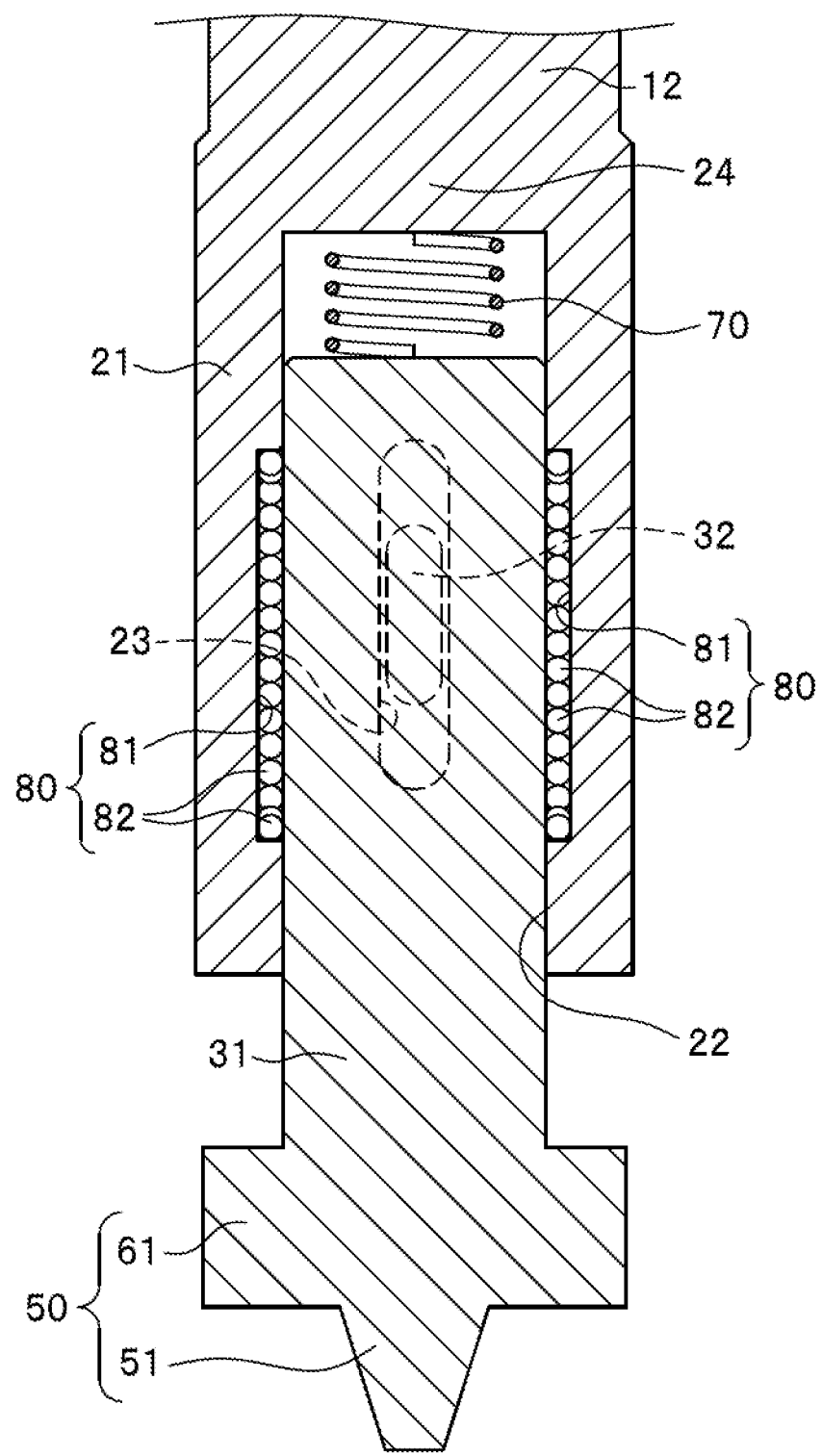
FIG. 8 is a vertical sectional view showing the first modified example of the rotary tool according to the embodiment.

Next, a rotary tool according to a first modified example will be described with reference to FIGS. 7 and 8. As shown in FIGS. 7 and 8, the rotary tool according to the modified example is provided with a slide unit 80 inside the holder 21. The slide unit 80 is provided on the inner peripheral surface of the holder 21. The slide unit 80 includes a bearing groove 81 formed on the inner peripheral surface of the holder 21 and a plurality of balls 82, 82, . . . that slide inside the bearing groove 81. The bearing groove 81 is formed in an oval shape that is long in the axial direction when viewed from the side. The depth of the bearing groove 81 is smaller than the diameter of the ball 82. A plurality of balls 82 are arranged inside the bearing groove 81. A part of the ball 82 is slidably in contact with the outer peripheral surface of the slide shaft 31, while another part thereof is slidably in contact with the inner surface of the bearing groove 81. Other configurations are the same as those of the above embodiment, and thus are denoted by the same reference numerals and description thereof will be omitted. According to the rotary tool having such a configuration, the slide shaft 31 can be smoothly moved in the axial direction with respect to the holder 21.

7. Second Embodiment

Figure 9:
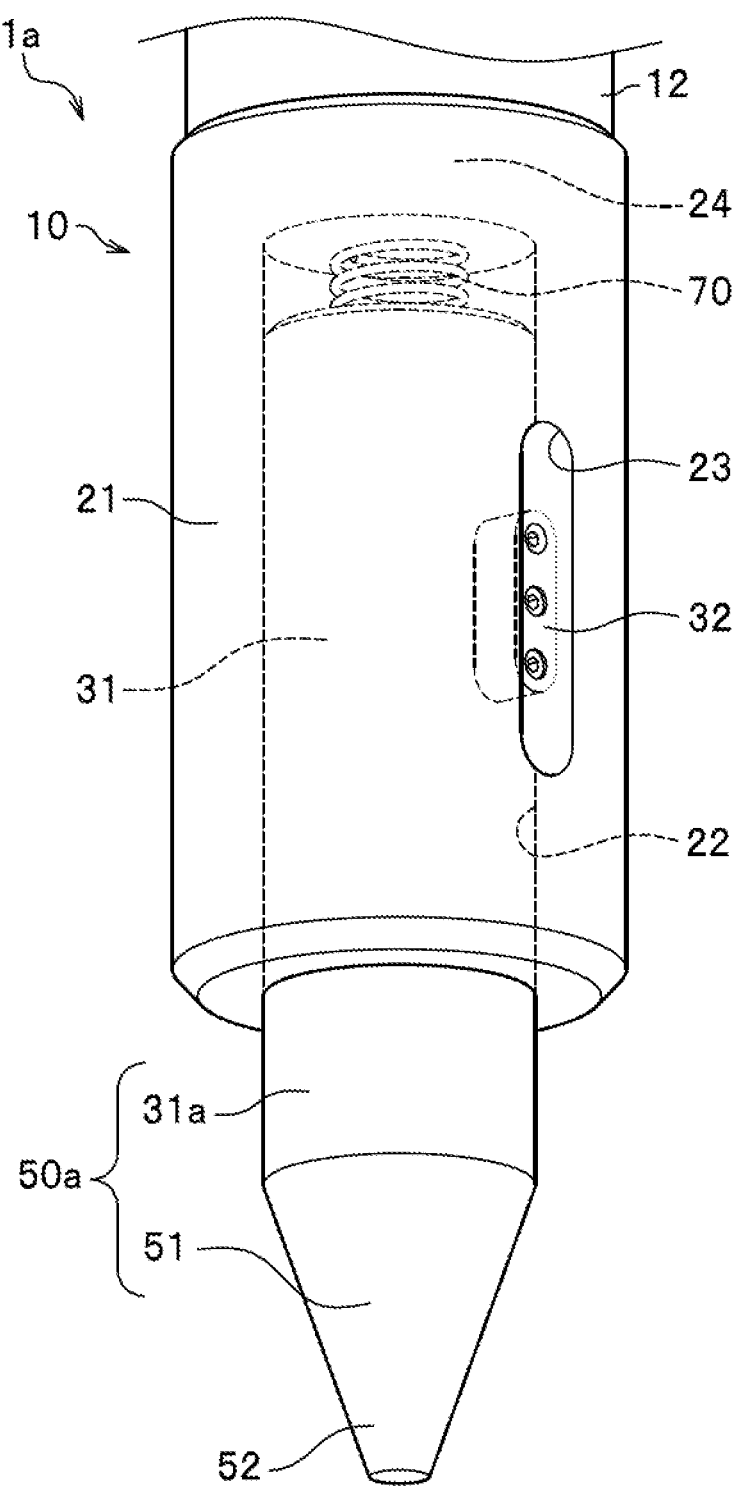
FIG. 9 is a perspective view showing a second embodiment of the rotary tool according to the embodiment.

Next, a rotary tool 1a according to a second embodiment will be described with reference to FIG. 9. In the first embodiment, the stirring member 50 is the conventional type with the stirring pin 51 and the shoulder 61. However, the present invention is not limited thereto. As shown in FIG. 9, a stirring member of the second embodiment is a shoulder-less type without a shoulder.

A shoulder-less stirring member 50a includes a cylindrical connector 31a connected to the slide shaft 31, and a stirring pin 51 integrally connected to a distal end portion of the connector 31a. The connector 31a has the same diameter as the diameter of the slide shaft 31 and the diameter of the base end portion of the stirring pin 51, and the connector 31a is continuous with the outer peripheral portion of the stirring pin 51. The stirring pin 51 protrudes (hangs down) from the distal end surface (lower end surface) of the connector 31a toward the distal-end side. Note that the connector 31a is not limited to the cylindrical shape, and may have a truncated cone shape whose diameter decreases toward the distal-end side. In this case, the diameter of the distal end portion of the connector 31a can be set the same as the diameter of the base end portion of the stirring pin 51, and the inclined surface of the connector 31a and the inclined surface of the stirring pin 51 can be set to have the same inclination angle. Other configurations are the same as those of the above embodiment, and thus are denoted by the same reference numerals and description thereof will be omitted.

The rotary tool 1a according to this embodiment makes it possible to perform load control where the insertion depth of the stirring pin 51 into the joint member 2 can be controlled by utilizing the elasticity of the elastic member 70, as in the case of the rotary tool 1 according to the first embodiment. The rotary tool 1a provided with the shoulder-less stirring member 50a according to this embodiment also makes it possible to reduce the pressing force of the rotary tool 1a during friction stir welding.

In a joining device and a joining method using the rotary tool 1a provided with the shoulder-less stirring member 50a as described above, friction stir welding is performed on the joint member by moving the rotary tool 1a to be in a predetermined height position with respect to the joint member by means of a position controller and then inserting only the stirring pin 51 into the joint member in a state where the connector is separated from the joint member. According to the joining device and the joining method as described above, the width of a plasticized area can be reduced and the pressing force of the rotary tool 1a can be reduced as compared with the case where the shoulder of the rotary tool is pushed. Also, load applied to a friction stirring device can be reduced as compared with the case where the shoulder of the rotary tool is pushed. Further, a deep position of a butted part can be joined in a state where a large load is not applied to the friction stirring device.

8. Others

Although embodiments of the present invention have been described above, the design can be changed as appropriate within the scope of the gist of the present invention. In the above embodiments, the key groove 23 is formed in the holder 21 and the key 32 is formed in the slide shaft 31, but the present invention is not limited thereto. A key may be formed on the holder 21 and a key groove may be formed in the slide shaft 31.

In the above embodiments, the elastic member 70 is housed inside the holder 21 and arranged between the base end portion of the slide shaft 31 and the bottom portion 24 of the holder 21 on the proximal-end side. However, the present invention is not limited thereto. The elastic member 70 may be arranged at any position as long as the elastic member biases the stirring member 50 toward the distal-end side. For example, the elastic member 70 may be arranged so as to surround the lower part of the slide shaft. In this case, the elastic member 70 is positioned near the intermediate portion between the slide shaft 31 and the stirring member 50, and the elastic member 70 evenly acts on the slide shaft 31 in the circumferential direction. Therefore, even when the slide shaft 31 moves, the elastic member 70 stably biases the stirring member 50 toward the distal-end side. Therefore, the elastic member 70 can be easily installed, and the precision of load control of the stirring member 50 can be improved. At the upper end portion of the slide shaft 31, a columnar extension portion is formed, which extends toward the upper end. The elastic member 70 may be mounted so as to surround the extension portion of the slide shaft 31 between the slide shaft and the bottom portion 24 of the holder 21 on the proximal-end side. In this event, the extension portion may be formed to have a diameter smaller than that of the slide shaft 31 according to the inside diameter of the holder 21. In such a case, the precision of load control of the stirring member 50 can also be improved.

REFERENCE SIGNS LIST

1 rotary tool
2 joint member
3 joining device
10 main body
11 fixed unit
12 rotary shaft
21 holder
23 key groove
31 slide shaft
32 key
50 stirring member
51 stirring pin
61 shoulder
70 elastic member
70 elastic member

The invention claimed is:

1. A rotary tool used in a joining device that performs friction stir welding of a joint member, the rotary tool comprising:
a main body having a fixed unit attached and secured to the joining device, and a rotary shaft for transmitting a rotary force from the joining device;
a stirring member that has a stirring pin inserted into the joint member to perform friction stirring on the joint member, that is arranged so as to be rotatable by receiving the rotary force from the rotary shaft, and that is provided on the main body so as to be movable relative to an axial direction of the rotary shaft; and
an elastic member that biases the stirring member toward a distal-end side relative to the axial direction of the rotary shaft;
wherein the main body further includes a holder attached to the rotary shaft and a slide shaft that rotates synchronously with the holder, the holder has a bottomed cylindrical shape and includes a housing recess formed therein, the housing recess having a bottom portion at its base end side and opening toward an axial distal end of the rotary shaft,
the slide shaft is housed in the housing recess of the holder so as to be slidable in the axial direction of the rotary shaft,
the stirring member is provided at a distal end of the slide shaft,
the slide shaft is biased toward the distal-end side of the stirring member via the elastic member,
a columnar extension portion is formed at a base end portion of the slide shaft, the extension portion extending toward the base end side of the holder, and
the elastic member is housed inside the holder and mounted so as to surround the extension portion of the slide shaft, the elastic member being arranged between the base end portion of the slide shaft and the bottom portion of the housing recess of the holder.

2. The rotary tool according to claim 1, wherein the elastic member is arranged so as to surround a lower part of the slide shaft.

3. The rotary tool according to claim 1, wherein a key groove elongated in the axial direction of the rotary shaft is formed on one of the holder and the slide shaft, and a key is formed on the other one of the holder and the slide shaft so as to extend in a direction intersecting with the axial direction of the rotary shaft and fit into the key groove,
the key moves inside the key groove along the axial direction of the rotary shaft as the slide shaft moves in the axial direction of the rotary shaft, and
the key and the key groove come into contact with each other in a circumferential direction as the holder rotates, and thus the holder and the slide shaft rotate synchronously.

4. The rotary tool according to claim 1, wherein the elastic member imparts elastic force by at least one selected from a solid spring, a fluid spring, magnetic force, and electromagnetic force.

5. The rotary tool according to claim 1, wherein the stirring member further includes a shoulder, the shoulder being connected to the slide shaft, having a cylindrical or truncated cone shape, and having a lower end surface with a flat or mortar-shaped configuration, and the lower end surface thereof comes into contact with the joint member, and
the stirring pin hangs down from the lower end surface of the shoulder.

6. The rotary tool according to claim 1, wherein the stirring member further includes a connector that is connected to the slide shaft and has a cylindrical or truncated cone shape, and
the stirring pin hangs down from a lower end surface of the connector.

7. A joining device including the rotary tool according to claim 1, the joining device comprising:
a power unit that outputs the rotary force to be transmitted to the rotary shaft of the rotary tool; and
a position controller that performs position control of the rotary tool by holding the fixed unit of the rotary tool, wherein
friction stir welding is performed on the joint member by moving the rotary tool to be in a predetermined height position with respect to the joint member by the position controller and inserting the stirring pin into the joint member.

8. The joining device according to claim 7, wherein the rotary tool includes:
a) on the main body a cylindrical holder attached to the rotary shaft and a slide shaft that is housed in a center portion of the holder so as to be slidable in the axial direction of the rotary shaft and that rotates synchronously with the holder,
b) the stirring member is provided at a distal end of the slide shaft,
c) the slide shaft is biased toward the distal-end side of the stirring member via the elastic member,
d) the stirring member further includes a shoulder, the shoulder being connected to the slide shaft, having a cylindrical or truncated cone shape, and having a lower end surface with a flat or mortar-shaped configuration, and the lower end surface thereof comes into contact with the joint member, and
e) the stirring pin hangs down from the lower end surface of the shoulder;
and wherein
friction stir welding is performed on the joint member by inserting the stirring pin and the shoulder that rotates together with the stirring pin into the joint member.

9. The joining device according to claim 7, wherein the rotary tool includes:
a) on the main body a cylindrical holder attached to the rotary shaft and a slide shaft that is housed in a center portion of the holder so as to be slidable in the axial direction of the rotary shaft and that rotates synchronously with the holder,
b) the stirring member is provided at a distal end of the slide shaft,
c) the slide shaft is biased toward the distal-end side of the stirring member via the elastic member:
d) the stirring member further includes a connector that is connected to the slide shaft and has a cylindrical or truncated cone shape, and
e) the stirring pin hangs down from a lower end surface of the connector,
and wherein
friction stir welding is performed on the joint member by inserting only the rotating stirring pin into the joint member in a state where the connector is separated from the joint member.

10. A joining method comprising:
performing friction stir welding on the joint member by moving the rotary tool according to claim 1 to be in a predetermined height position with respect to the joint member and inserting the stirring pin into the joint member.

11. The joining method according to claim 10, wherein the rotary tool includes:
a) on the main body a cylindrical holder attached to the rotary shaft and a slide shaft that is housed in a center portion of the holder so as to be slidable in the axial direction of the rotary shaft and that rotates synchronously with the holder,
b) the stirring member is provided at a distal end of the slide shaft,
c) the slide shaft is biased toward the distal-end side of the stirring member via the elastic member,
d) the stirring member further includes a shoulder, the shoulder being connected to the slide shaft, having a cylindrical or truncated cone shape, and having a lower end surface with a flat or mortar-shaped configuration, and the lower end surface thereof comes into contact with the joint member, and
e) the stirring pin hangs down from the lower end surface of the shoulder;
and wherein
friction stir welding is performed on the joint member by inserting the stirring pin and the shoulder that rotates together with the stirring pin into the joint member.

12. The joining method according to claim 10, wherein the rotary tool includes:
a) on the main body a cylindrical holder attached to the rotary shaft and a slide shaft that is housed in a center portion of the holder so as to be slidable in the axial direction of the rotary shaft and that rotates synchronously with the holder,
b) the stirring member is provided at a distal end of the slide shaft,
c) the slide shaft is biased toward the distal-end side of the stirring member via the elastic member;
d) the stirring member further includes a connector that is connected to the slide shaft and has a cylindrical or truncated cone shape, and
e) the stirring pin hangs down from a lower end surface of the connector,
and wherein
friction stir welding is performed on the joint member by inserting only the rotating stirring pin into the joint member in a state where the connector is separated from the joint member.

* * * * *